United States Patent [19]

Gruber

[11] 4,191,799
[45] Mar. 4, 1980

[54] BONDING CARPET BACKING USING A LATEX EXTENDED WITH GRAFTED MINERAL OIL

[75] Inventor: David P. Gruber, Northampton Township, Summit County, Ohio

[73] Assignee: The General Tire & Rubber Company, Akron, Ohio

[21] Appl. No.: 848,625

[22] Filed: Nov. 4, 1977

[51] Int. Cl.$^2$ .................. B32B 25/10; B32B 25/14; C08L 9/08; C08L 51/00

[52] U.S. Cl. .................................. 428/96; 156/72; 156/327; 156/333; 156/334; 208/95; 260/29.7 GP; 260/29.7 UP; 260/29.7 W; 260/33.6 AQ; 260/759; 428/95; 525/80

[58] Field of Search ............. 156/72, 327, 333, 334; 208/46, 95, 282, 290; 260/29.7 GP, 33.6 AQ, 29.7 UP, 759, 879, 889, 29.7 W; 428/95, 96

[56] References Cited

U.S. PATENT DOCUMENTS

| | | | |
|---|---|---|---|
| 2,068,850 | 1/1937 | Ellis | 208/282 X |
| 2,778,807 | 1/1957 | Boggs et al. | 260/759 X |
| 2,984,608 | 5/1961 | Adany | |
| 3,081,276 | 3/1963 | Snyder et al. | 260/759 X |
| 3,479,313 | 11/1969 | Kreider | 260/29.7 |
| 3,875,104 | 4/1975 | Siegele et al. | 260/33.6 AQ |
| 4,009,310 | 2/1977 | Scobbo | 156/72 X |

FOREIGN PATENT DOCUMENTS

| | | |
|---|---|---|
| 1210637 | 3/1960 | France . |
| 843182 | 8/1960 | United Kingdom . |
| 1266123 | 3/1972 | United Kingdom . |
| 1309467 | 3/1973 | United Kingdom . |
| 1452439 | 10/1976 | United Kingdom . |

*Primary Examiner*—William A. Powell
*Assistant Examiner*—Robert A. Dawson

[57] ABSTRACT

Free-radical graft polymerization of an unsaturated monomer like acrylic acid, methacrylic acid and so forth on mineral oils such as rubber processing and/or extending oils provides a "grafted oil" which can be used to extend polymers such as carboxylated SBR latices with substantial retention of their original adhesive properties. These graft modified oils, also, can be used as seeds or emulsifiers, when emulsified, in emulsion polymerization. These grafted oils can be used as plasticizers for plastics and dry rubbers.

10 Claims, No Drawings

BONDING CARPET BACKING USING A LATEX EXTENDED WITH GRAFTED MINERAL OIL

DISCUSSION OF THE PRIOR ART

The technique of polymerizing or copolymerizing one or more monomers in the presence of a polymer or a substrate, "grafting technique," is known and is frequently called graft polymerization or graft copolymerization. In this connection, please see "Copolymerization," High Polymers, Vol. XVIII, Ham, pages 323–324, 335–420 and 573, Interscience Publishers a division of John Wiley & Sons, New York, 1964; "Block And Graft Polymers," Burlant and Hoffman, Reinhold Publishing Corporation, New York, 1960; "Block And Graft Copolymers," Ceresa, Butterworth & Co. (Publishers) Ltd., London, 1962; and "Graft Copolymers," Polymer Reviews, Vol. 16, Battaerd and Tregear, Interscience Publishers, a division of John Wiley & Sons, New York, 1967.

U.S. Pat. No. 2,984,608 discloses a process of heating a solid hydrocarbon with a polymerizable monomer to form a solution which is then cooled to form a gel. Next, the gel is irradiated to obtain a hard, homogenous, opaque product having properties which are different substantially from those of the polymer normally obtained from the corresponding monomer. As solid hydrocarbons there are shown "Vaseline" having a m.p. of 30°–40° C., chlorinated paraffin and distillation products from tar, wood, turf, lignite, and bituminous shale having melting points of 55° to 70° C. As monomers there are shown vinyl acetate, styrene, acrylonitrile and methyl methacrylate. The parts ratio of "grafting" monomer to solid hydrocarbon as shown only in the working examples is 100:2 to 100:10.

U.S. Pat. No. 3,479,313 discloses a process for extending latex (e.g., SBR) particles with oil or plasticizers by forming a charge on the oil which is different from the charge on the latex rubber particles, the net charge on the latex particles predominating. An acid such as acetic may be used to change weak cationic surfactants to strong surfactants. Anionic, and cationic surfactants can be used.

BACKGROUND OF THE INVENTION

A carpet or rug, comprising a plurality of fibers or tufts of fibers woven with a first or primary fibrous backing material, is treated with an aqueous curable adhesive composition such as a rubber latex which serves to bind those portions of the fibers or tufts woven into the backing to the backing and is then laminated by pressure to a secondary fibrous or woven backing to force the adhesive at least in part into the first backing and about the loops of the fibers and at least in part into the second backing. The resulting composite laminate is then heated or dried to remove the water and cure the adhesive to bind the ends of the tufts or fibers to the primary backing and the primary backing to the secondary backing to form an integral laminate.

Attempts have been made to incorporate rubber compounding processing and/or extender oils into these latex carpet backing adhesives to reduce costs. However, to incorporate useful amounts of these processing oils into the latices has required significant quantities of various surfactants which have had a deleterious effect on the adhesive properties of the latices.

It, therefore, is an object of this invention to avoid the difficulties alluded to above and to provide a method of oil extending a latex adhesive useful, among other things, for carpet backing purposes without appreciably reducing its adhesive properties.

It is another object of this invention to provide a grafted rubber processing an/or extender oil which can be used for extending latex adhesives and for other purposes.

A further object is to provide a carpet having a backing secured to the fibers of the carpet by means of an oil extended adhesive.

These and other objects and advantages of the present invention will become more apparent to those skilled in the art from the following detailed description and working examples.

SUMMARY OF THE INVENTION

It has been found that ethylenically unsaturated monomers can be grafted onto mineral oils. These grafted oils can be used as rubber or plastic extenders or plasticizers or as emulsifiers or seeds in polymerization. These grafted oils, the products of the present invention, are liquids or fluids at room temperature and at times may contain a dispersed phase; they are not solids or semisolids at room temperature. In particular, it has been found that a monomer such as acrylic acid can be grafted on a rubber compounding process and/or extender oil. When the grafted oil is emulsified with ammonium hydroxide and water, it can be used to extend a latex of a carboxylated butadiene-1,3/styrene copolymer to provide a latex adhesive which when used as a carpet backing exhibits substantially the same adhesive properties as a latex which is not oil extended. This provides a method for lowering the costs of the adhesive or other latex. Also, it has been found that such an emulsified grafted oil can be used as an emulsifier or seed in aqueous alkaline emulsion polymerization in place of more expensive surfactants or emulsifiers.

DISCUSSION OF DETAILS AND PREFERRED EMBODIMENTS

The monomers preferred in the practice of the present invention are acrylic acid, methacrylic acid, maleic acid, fumaric acid, vinyl benzoic acid, α-chloroacrylic acid, crotonic acid and itaconic acid. Other monomers which can be used are maleic anhydride, methyl acrylate, ethyl acrylate, butyl acrylate, isobutyl acrylate, ethyl hexyl acrylate, methyl methacrylate, ethyl methacrylate, 2-hydroxy ethyl acrylate, 2-hydroxy propyl acrylate, hydroxy ethyl methacrylate, hydroxy propylmethacrylate, ethylene, butadiene, isoprene, chloroprene, styrene, alpha methyl styrene, vinyl toluene, acrylamide, methacrylamide, acrylonitrile, methacrylonitrile, diethyl fumarate, vinyl pyridine, vinyl chloride, vinylidene chloride, vinyl acetate, and the like. These monomers are characterized by having an ethylenic carbon-to-carbon double bond which can undergo addition polymerization and have from 2 to 16 carbon atoms, Mixtures of monomers can be used. These monomers should be compatible in the sense that they should not interfere with each other during graft polymerization nor prevent each other from grafting onto the oil although they may copolymerize. Moreover, the monomer may be one which renders the oil compatible with the polymer which is to be extended with the oil as well as with monomers, catalysts, and water when used as a seed or surfactant in an emulsion polymerization system. For example, an acrylic acid grafted oil may be used with a carboxylated butadiene-styrene copolymer latex. A vinyl acetate grafted oil may be used with an ethylene-vinyl acetate copolymer latex. A styrene grafted oil may be used with a butadiene-styrene copolymer latex. An acrylonitrile grafted oil may be used with a butadiene-acrylonitrile copolymer latex.

It will be appreciated that an acrylate or maleic anhydride grafted processing oil can be hydrolyzed and neutralized to free the acid groups although this is not as convenient as directly grafting an acid such as acrylic acid onto the oil. A processing oil grafted with an acid such as acrylic acid or other unsaturated acid can further be reacted with an epoxide (see U.S. Pat. No. 3,873,480). A processing oil grafted with vinyl acetate can be treated with alcohol and an acid catalyst to convert some or all of the ester groups to hydroxyl groups if such reactive or water sensitive groups are desired. See Schildknecht, "Vinyl And Related Polymers," 1952, John Wiley & Sons, Inc., New York.

The oils to be grafted are mineral oils. Preferably, the oils to be grafted are rubber compounding processing or extender oils which also may be considered sometimes as plasticizers or softeners. These processing oils may be of the aromatic including highly aromatic, naphthenic or paraffinic type or mixture thereof. The processing oils preferably should be non-staining, be light colored or clear where light colored products are desired, and have low volatility. The pour point of the processing oils should be below about 30° C. These processing oils should have a viscosity SUS (Saybolt Universal viscosity seconds) at about 38° C. of from about 40 to 27,000 preferably from about 40 to 7,000 and a molecular weight of from about 220 to 2,400, preferably from about 220 to 720. The molecular type analysis of these processing oils, clay-gel weight should be from about 0. to 0.1% asphaltenes, from about 0.2–18% polar compounds, from about 10 to 80% aromatic compounds, and from about 10 to 90% of saturates. It is well known that the polar compounds are designated as such since their hydrocarbon molecules may contain nitrogen, oxygen and/or sulfur atoms. The carbon type analyses of these processing oils show that they contain from about 3 to 47% aromatic carbon atoms ($C_A$), from about 19 to 44% naphthenic carbon atoms ($C_N$), and from about 31 to 73% paraffinic carbon atoms ($C_P$). Processing or extending oils used in rubber compounding are well known. See "Plasticizer Technology," Vol. 1, Bruins, 1965, Reinhold Publishing Corporation, New York; "India Rubber World,"Vol. 126, No. 4, July, 1952, pages 495–499; "Industrial And Engineering Chemistry,"May, 1953, pages 1035–1053; ASTM Specification D 2226-70; Sun Oil Company, Industrial Products Department, Technical Bulletin No. 88, "Rubber Process & Extender Oils," 12 pages; "Petroleum Oils For the Chemical Process Industry," Sun Oil Company, Bulletin No. Al-1006, Copyright 1976, 8 pages; and "Materials, Compounding Ingredients, And Machinery For Rubber," 1977, Bill Communications, Inc., New York.

Free radical catalysts (free-radical formers or free-radical-forming systems) are used in the practice of the present invention in a minor amount sufficient to provide for polymerization of the polymerizable monomers. Oil soluble free radical catalysts preferably should be employed. Also, the free radical catalyst should be sufficiently reactive to polymerize the monomers and to undergo reaction with the oil or to open up the double bond of the monomer and to abstract a labile atom from the oil or to open up any, especially aliphatic, double bonds of the oil. Examples of free radical catalysts are dibenzoyl peroxide, diacetyl peroxide, didecanoyl peroxide, di-t-butyl peroxide, dilauroyl peroxide, bis (p-methoxy benzoyl) peroxide, t-butyl peroxy pivalate, dicumyl peroxide, percarbonates azobisdimethylvaleronitrile, 2,2'-azobisisobutyronitrile, 2,2'-azobis-2-methylbutyronitrile, 2,2'-azobis(methylisobutyrate) and the persulfates like Na, K or ammonium persulfate, and the like and mixtures of the same.

The grafting process can be conducted in resin kettles under an atmosphere of an inert gas such as nitrogen, argon, neon, helium and so forth and mixtures thereof. For reasons of safety it is preferred to use conventional closed polymerization reactors operating under an atmosphere of the inert gas. Pressure may be used where the monomer is a gas or is volatile. Temperatures during the polymerization reaction should be sufficient to decompose the catalyst to cause polymerization and to maintain a fluid polymerization mass. Solvents, also, may be used to control heat exchange and viscosity during graft polymerization. They are usually low m.w. hydrocarbons such as hexane, heptane, benzene, toluene, mixtures thereof and so forth and may be stripped from the graft polymer after polymerization. The solvents should be chosen so as not to form an azeotrope with the oil or grafted oil. Chain transfer agents such as mercaptans, also, may be used during grafting. The reactors should be provided with heating and cooling means, agitators or stirrers, and means to discharge and charge the reactors. Only a minor amount of catalyst, enough to cause polymerization, is used during the grafting process. The amount of monomer grafted onto the oil varies from about 2 to 20 parts by weight, preferably from about 5 to b 15 parts by weight, per 100 parts by weight of the oil. It will be appreciated that the grafted oil may include some homopolymer from the monomer and that some of the polymerizable monomer may cause cross-linking between the oil molecules.

During graft polymerization the mixture preferably should be well agitated to ensure that the monomers are well distributed among the oil molecules or randomly grafted on the oil molecule backbone. Where different polymerizable monomers are used, it will be appreciated that copolymers likewise can be formed. The resulting grafted oil is used in a minor amount by weight as compared to the latex to be extended (on a dry weight basis) to extend and/or plasticize the polymer of the latex. Preferably, the grafted oil is used in an amount of from about 5 to 40 parts by weight per 100 parts by weight of the polymer which is to be extended (on a dry weight basis).

While the monomer(s), oil and catalyst may all be charged at once to the reactor and polymerization started, it is preferred to mix all of the polymerizable acid initially with about 75% by weight of the oil and about 50–60% by weight of the catalyst. The remainder of the oil and catalyst are mixed together, and then the mixture is added in 4 to 5 increments during the polymerization. However, other ways of charging and/or incrementally adding the ingredients may be followed.

After grafting the process oil where an acid such as acrylic acid is used, the grafted oil is treated with ammonia or a low molecular weight water soluble amine such as methyl amine, ethylamine, propyl amine, butyl amine, triethylamine, aniline or KOH, NaOH, etc. and mixed with water to form an emulsion which is compatible with the latex to be oil extended such as an aqueous alkaline carboxylated butadiene-styrene copolymer. Where a monomer such as styrene is grafted onto the oil, the grafted oil can be mixed with water and an emulsifier and added to a butadiene-styrene aqueous alkaline latex. Instead of a fugitive base like ammonia, sodium or potassium hydroxide can be used so long as it does not adversely affect the properties of the resulting carpet or other product. Mixtures of alkaline materials can be used.

A feature of the present invention is that the grafted oil of the present invention can be used as a seed or emulsifier in aqueous alkaline emulsion polymerization of butadiene or isoprene alone or with at least one copolymerizable monomer such as styrene, α-methyl styrene, methyl acrylate, ethyl acrylate, butyl acrylate, ethylhexyl acrylate, acrylonitrile, methacrylonitrile, and so forth and mixtures of the same. Methods for making such polymers or copolymers are well known to those skilled in the art.

The grafted oils of the present invention, also, can be used to extend paper coating latices in the manufacture of paper coatings. See U.S. Pat. No. 3,873,480 and the references mentioned therein.

While the invention has been described with respect to latices, it will be appreciated that the grafted oil can be mill mixed or Banbury mixed with the rubber in dry form. Alternatively, the grafted oil and the dry rubber can be solvent mixed and the solvent stripped from the same.

While the process of the present invention can be applied to the back of any woven or nonwoven carpet (or rug) material to secure the base yarns to the other yarns of the carpet such as Wilton, Axminster, knitted and other carpets, as well as to a secondary backing, it is particularly useful in the manufacture of piled or tufted carpets. In piled or tufted carpets the fibers or yarn is needled or looped through the interstices or holes in a square woven or nonwoven primary cloth such as cotton, polypropylene, jute or other primary backing material or other natural or synthetic fibrous material or mixture thereof. For a thorough discussion of the manufacture of carpets and especially tufted carpets please see "Carpets And Other Textile Floor Coverings," Robinson, 2nd Ed., 1972, Textile Book Service, Division of Bonn Industries Inc., The Trinity Press, London. Please, also, see "Wellington Sears Handbook of Industrial Textiles," Kaswell, 1963, Wellington Sears Co., Inc., New York.

The yarns or tufts of the carpet can be natural or synthetic organic fibers or mixtures thereof. Additionally, the yarns may vary from one type to another type. Examples of such yarns are those from silk, cotton, wool, hair, nylon, acrylics ("Acrilan"), polyester, polyvinyl chloride, vinyl chloride-vinyl acetate copolymers, polyurethanes, rayon, polyacrylonitriles, vinyl chloride or vinylidene chloride copolymerized with acrylonitrile, polyvinylidene chloride, polypropylene fibers and the like. Glass fibers may be blended or woven with the natural and/or synthetic organic fibers. These fibers or yarns can contain fire retardants, antistatic agents, bacteriostats, antidegradants, dyes, pigments, optical brightners, and so forth.

The latex adhesive used in the practice of the backing system is generally a water based system of polyvinyl acetate, polyacrylates, polyethylene-vinyl acetate copolymers, styrene-butadiene copolymers (SBR), and/or carboxylated styrene-butadiene copolymers.

The latex preferably used in rug or carpet backing operations is an aqueous dispersion of a flexible crosslinkable COOH-containing polymer or mixtures of polymers. Examples of such polymers are the copolymers of butadiene, isoprene, 2,3-dimethyl butadiene and other dienes of 4 to 6 carbon atoms with a copolymerizable unsaturated acid such as acrylic acid, methacrylic acid, maleic acid, maleic anhydride, fumaric acid, itaconic acid, vinyl benzoic acid, α-chloro acrylic acid, crotonic acid, and the like and mixtures thereof. There, also, may be copolymerized with the diene and acid monomer one or more other copolymerizable monomers such as styrene, α-methyl styrene, vinyl toluene, acrylonitrile, methacrylonitrile, methyacrylate, ethylacrylate, butyl acrylate, ethyl hexylacrylate, methyl methacrylate, hydroxy ethyl acrylate, hydroxy propyl acrylate, hydroxy ethyl methacrylate, acrylamide, methacrylamide, and the like and mixtures thereof. Still other polymers can be used such as the copolymers of one or more of the above acrylates and one or more of the above acrylic acids. The addition of the third, fourth, etc. monomer will be determined by the need for compatibility with the carpet materials, stiffness, and the toughness, strength, water and solvent resistance and so forth desired. Even more preferred copolymers to use are the aqueous emulsions of flexible carboxylated butadiene styrene copolymers, e.g., copolymers of butadiene, styrene and at least one acid selected from the group consisting of acrylic, methacrylic, fumaric, maleic, and itaconic acids optionally with a hydroxy lower alkyl acrylate. These copolymers may be prepared in aqueous emulsion systems using conventional emulsifiers, chain transfer agents, antioxidants, short-stop agents, free radical catalysts and so forth as well known to the art. Methods for making these polymers are disclosed in U.S. Pat. Nos. 2,604,668; 2,669,550; 2,710,292; 2,724,707; 2,849,426; 2,868,754; 3,392,048; 3,404,116; 3,409,569; and 3,468,833. Please, also, see "Rubber World," September, 1954, pages 784 to 788 and "Industrial And Engineering Chemistry," May, 1955, pages 1006 to 1012. See, also, U.S. Pat. No. 4,009,310. The aqueous adhesive can have a solids content of from about 30 to 60%, have a pH of about 7.5 to 11.5 and have a Brookfield viscosity of about 50–350 (LVF Model #2 Spindle @ 60 rpm) cps at 25° C.

However, other polymers can be graft oil extended according to the process of the present invention such as polyvinyl chloride, polystyrene, polyvinylidene chloride, polymethylmethacrylate, polyethylmethacrylate, polyvinyl chloride-vinylidene chloride, polychloroprene, butadiene-acrylonitrile copolymers, butadiene-styrene-acrylonitrile copolymers, butadiene-styrene-vinyl pyridine copolymers, and so forth. Since the grafted oil of the present invention acts not only as an extender but also generally as a plasticizer, it may be desirable to increase the amount of hard monomer in a copolymer to obtain the same degree of flexibility. Thus, in a carboxylated butadiene-styrene copolymer it may be desirable to increase the styrene content from about 50% to from about 55 to 90%.

The carboxylated copolymers are readily crosslinked by means of polyvalent metal compounds such as the hydroxides, and oxides of zinc, magnesium, calcium, titanium, barium, strontium, cobalt, tin, iron, lead and others. The chloride, sulfate, nitrate, acetate, and formate salts of Ca, Mg, Sn, Fe, Sr, Ni, Zn and Co may also be used as crosslinking agents.

Sodium or alkali-metal aluminate may also be used as a crosslinking agent. Polyamines, moreover, can be used as crosslinking agents such as ethylene diamine, 1,3-diaminobutane, diethylenetriamine, and the like. Other crosslinking agents can be used such as the epoxides, aminoformaldehyde resins, phenol-formaldehyde resins, urea-formaldehyde resins, urea-melamine resins and so forth. Additionally, sulfur curing systems can be added to the copolymer composition if it contains sulfur curable unsaturation; however, such requires extended curing times at elevated temperatures and may not be too desirable. In fact if a pigment or filler such as limestone, calcium carbonate, is employed, it should furnish sufficient divalent metallic ions during the curing step to provide the necessary crosslinking between the COOH groups of the copolymer. Other divalent metal carbonates may likewise be used. Mixtures of the various curing or crosslinking agents can be used.

In addition to the curing agents the aqueous carboxylated copolymeric latex adhesive composition can contain the usual antioxidants, dispersing agents, clay, defoamers, urea, $TiO_2$, thickeners, fire retardants, bacteriostats, pigments or colorants, surfactants, alumina, alumina hydrate, U-V absorbers, ammonia cut casein, and so forth.

The compounds aqueous adhesive composition can contain as high as about 85% total solids content, and its intial viscosity can vary from about 9000 to 20000 cps. or higher. It can be used as such or frothed with air or other gas which is nonreactive under spreading and curing conditions to form a foam containing about 20-65% gas.

The compounds aqueous adhesive coating composition can be applied to the back of the carpet by air knife coating, blade coating, brush-finish coating, cast coating, flow-on coating, knife coating, machine coating, polished drum coating, print on coating, roll coating, spray coating, wire wound rod coating or other methods known to the art for coating the backing of a carpet.

The secondary backing material or layer can be made of any natural or synthetic fibers or mixtures thereof such as cotton, rayon, nylon, polypropylene, acrylics, hair or bast and so forth and is usually made of square woven fibers. Bast fibers include jute, flax, hemp, sunn, ramie, henaf, urena, nettle and the like. Of these backing materials it is preferred to use jute fibers. Please see "Matthews' Textile Fibers," Mauersberger, 6th Edition, John Wiley & Sons, Inc., New York, 1954, pages 257 to 281. Jute fibers are well known commercially, and sources of the same can readily be found in "The Carpet and Rug Institute Directory and Report," 1974–75, September, 1975, published by the Carpet and Rug Institute, Dalton, Georgia. Prior to the use in the practice of the present invention the jute other backing fiber can be sized with starch, treated with antidegradants, fire retardants, steam or hot water and so forth.

To review the process, the carpet layer is secured on a tenter (a frame or rack with hooks or clips along two sides used for drying or stretching cloth) or other suitable apparatus and is carried against a roller which coats and impregnates the back of the carpet with the aqueous adhesive composition at ambient temperature. Then a layer of the second jute backing is roll pressed against the back of the carpet containing the adhesive layer and held by the tenter frame to prevent separation from the adhesive coated and impregnated back of the carpet and passed through an air oven at a temperature and for a time sufficient to dry the laminate and cure the adhesive, preferably at a temperature of from about 120 to 205° C. for from about 1 to 30 minutes. This causes evaporation of the water and curing of the polymer to cause it to adhere or bind the secondary backing to the back of the carpet to form a carpet with a secondary backing integrally bonded to the back of the carpet as well as to bind the fibers of the carpet thereto. If the adhesive is a frothed or foamed adhesive, the pressing of the secondary backing against the back of the carpet causes collapse of the froth and further penetration of the adhesive into the back of the carpet and into the secondary jute backing. The adhesive serves to lock the ends of the tufts or fibers of the carpeting to its cloth or backing and to the secondary backing.

The temperature during drying and of the adhesive and secondary backing and crosslinking of the adhesive should be below that which would adversely affect the properties of the tufts or bulk of the fibers of the carpet by causing loss of strength, melting and so forth.

While the grafted oils of this invention, especially when emulsified, can be used in extending carpet backing latex adhesives, they, also, can be used in paper coating latices. The grafted oils, moreover, can be used as extenders for the rubbery polymers like SBR rubber, nitrile rubber, chloroprene rubber and so forth and as plasticizers for polyvinyl chloride and other plastics. The grafted oils of this invention, especially when emulsified, also can be used as emulsifiers or seeds in aqueous alkaline emulsion polymerization and copolymerization.

The following examples will serve to illustrate the present invention with more particularity to those skilled in the art. In the examples all runs were conducted in sealed polymerization bottles or reactors or in resin flasks first flushed with nitrogen and also further in an inert atmosphere or under a blanket of an inert atmosphere such as nitrogen gas to exclude the air or oxygen and with agitation. Parts are parts by weight unless otherwise indicated.

EXAMPLE 1

120 grams of acrylic acid were mixed with 8 grams of "VAZO" and heated to 40° C. to dissolve the "VAO". This composition was added to 800 grams of "Sunpar" 2280 oil, under nitrogen and preheated to 100° C., in a resin flask in twelve equal increments at 5 minute intervals. The resulting mixture was heated an additional hour at 100° C. The results obtained were:
Original Oil Viscosity 640
Grafted Oil Viscosity 4250

EXAMPLE 2

120 grams of acrylic acid were mixed with 8 grams of "VAZO" and heated to 40° C. to dissolve the "VAZO". This composition was added to 800 gms. of "Circosol" 4240, under nitrogen and preheated to 100° C., in a resin flask in eleven equal increments at five minute intervals. The resulting mixture was reacted one additional hour at 100° C. The results obtained were as follows:
Original Oil Viscosity 380
Grafted Oil Viscosity 5000

EXAMPLE 3

120 grams of acrylic acid were mixed with 8 grams of "VAZO" and heated to 40° C. to dissolve the "VAZO". This composition was added to 800 gms. of "Sundex" 790 oil following the procedure of Example 1, above. The results obtained were as follows:
  Original Oil Viscosity 2700
  Final Oil Viscosity 750*
*Viscosity of top layer of two phases into which oil had separated. Bottom phase was a sludge-like material.

EXAMPLE 4

The method of Example 1, above, was repeated. The final Viscosity of the oil was 3650. The oil then separated into two phases on aging. The bottom oil phase contained a hard brittle substance.

EXAMPLE 5

The method of Example 1, above, was repeated and the final oil product separated into two phases on standing. The viscosities of the two phases were not measured.

EXAMPLE 6

120 grams of acrylic acid were mixed with 8 grams of "VAZO" and heated to 40°–45° C. to dissolve the "VAZO" and then mixed with 400 grams of "Circosol" 4240 oil. This mixture was added to 400 gms. of "Circosol" 4240 oil, preheated to 100° C. under nitrogen in a resin flask, from a separatory funnel with vigorous agitation over a one hour period. The reaction was continued an additional hour at 100° C. The final viscosity of the oil was 5500.

EXAMPLE 7

Emulsion copolymerization of butadiene and styrene was conducted as follows:

| Ingredients | Parts Run I | Run II |
| --- | --- | --- |
| Distilled Water | 118 ml. | 118 ml. |
| Solution A | 10 ml. | 10 ml. |
| Solution B | 10 ml. | 10 ml. |
| Styrene | 60 gm. ⎫ premixed | 60 gm. ⎫ premixed |
| "Sulfole" 120 | 0.1 gm. | 0.1 gm. |
| Grafted Oil from Ex. 6, above, 5500 cp., @ 25° C. | 20 gm. ⎭ | 20 gm. ⎭ |
| Butadiene-1,3 | 20 gm. | 20 gm. |

The ingredients were placed in 12 oz. polymerization bottles, capped and rotated in a polymerization bath to form the copolymer as indicated below:

| Reaction Temperature | 125° F. | 160° F. |
| --- | --- | --- |
| Reaction Time # | 13 to 29 hours | 5 hours |
| Final Viscosity | 3,400 | 5,850 |
| Total Solids (%) | 42.3 | 41.5 |
| pH | 9.5 | 9.5 | to completion.

| Solution A | |
| --- | --- |
| Ammonium Persulfate | 5.0 gm. |
| "Sequestrene" Na3 | 1.0 gm. |
| Water (Volumetric) to | 100 ml. |
| Solution B | |
| 28% NH3 in H2O | 23 gm. |
| Water (Volumetric) to | 100 ml. |

This example shows that the grafted oil of this invention can be used as an emulsifier or seed in emulsion polymerization.

EXAMPLE 8

120 grams of acrylic acid were mixed with 8 grams of "VAZO" and heated to ca. 40° C. to dissolve the "VAZO" and then added to 500 grams of "Sunpar" 2280 oil. This mixture then was added to 300 gms. of "Sunpar" 2280 oil, preheated to 100° C. under nitrogen in a resin flask, from a separatory funnel with vigorous agitation over ninety minutes. The reaction was continued one hour at 100° C. after addition was complete. The viscosity of the final oil was 5000 (24° C.).

EXAMPLE 9

120 grams of acrylic acid were mixed with 4 grams of "VAZO" and heated to ca. 40° C. to dissolve the "VAZO" and then mixed with 500 grams of "Sunpar" 2280 oil. The resulting mixture was next added to 300 gms. of "Sunpar" 2280 oil, preheated to 100° C. under nitrogen in a resin flask, from a separatory funnel with vigorous agitation over ninety minutes. The reaction was continued one hour after addition was complete at 100° C. The viscosity of the final product was 4600 (24° C.).

EXAMPLE 10

150 grams of acrylic acid were mixed with 5 grams of "VAZO" and with 5 grams of benzoyl peroxide. This mixture was heated to Ca. 40° C. to dissolve the initiators and then mixed with 625 grams of "Sunpar" 2280 oil. The resulting oil mixture was next added to 375 gms. of "Sunpar" 2280 over 105 minutes following the procedure of Example 9, above, and heated additionally at 100° C. The reaction was continued at 100° C. for additional periods of time. The results obtained are shown below:

| Reaction Time (Hours)* | Viscosity |
| --- | --- |
| 1¾ | 6100 |
| 2¾ | 4600 |
| 3¾ | 4600 |
| 4¾ | 4600 |

*Additional time plus original time.

EXAMPLE 11

120 grams of acrylic acid were mixed with 8 grams of "VAZO" and heated to 40° C. to dissolve the "VAZO" and then added to 120 grams of "Sunpar" 2280 oil. This mixture then was added in one addition to 680 gms. of "Sunpar" 2280 oil preheated to 100° C. under nitrogen with agitation. The temperature dropped to 85° C., and the reaction exothermed explosively.

EXAMPLE 12

Acrylic acid was grafted onto "Sunpar" 2280 oil in the pressure of water and an emulsifier.

| | Ingredients and Parts | | | | |
| --- | --- | --- | --- | --- | --- |
| Run | Acid | H2O | "VAZO" | "Tamol" N | Oil |
| A | 15 | 15 | 1.0 | 1.0 | 100 |
| B | 15 | 15 | 0.5 | 1.0 | 100 |
| C | 15 | 7.5 | 1.0 | 1.0 | 100 |
| D | 15 | 7.5 | 0.5 | 1.0 | 100 |
| E | 10 | 15 | 1.0 | 1.0 | 100 |
| F | 10 | 15 | 0.5 | 1.0 | 100 |
| G | 10 | 7.5 | 1.0 | 1.0 | 100 |

| | Ingredients and Parts | | | | |
|---|---|---|---|---|---|
| Run | Acid | H₂O | "VAZO" | "Tamol" N | Oil |
| H | 10 | 7.5 | 0.5 | 1.0 | 100 |

The ingredients were mixed in a Waring Belender under nitrogen and reacted at 88° C. to obtain polymerization. Example 12

| | Results | |
|---|---|---|
| Run | Viscosity | Surface Tension* |
| A | 6,400 | 61.2 |
| B | 11,500 | 64.8 |
| C | 11,200 | 63.8 |
| D | 19,800 | 64.3 |
| E | 5,250 | 64.8 |
| F | 5,600 | 64.2 |
| G | 5,000 | 62.7 |
| H | 6,400 | 62.7 |

*Tensiometer; after dilution with H₂O to 20% total solids content (TSC).

EXAMPLE 13

Acrylic acid was grafted onto petroleum oils using a free radical catalyst at 88° C. for 2 hours as shown below:

| | Ingredients and Parts | | |
|---|---|---|---|
| Run | Oil | Acrylic Acid | "VAZO" |
| | "Sunthene" 255 | | |
| A | 400 | 60 | 4.6 |
| B | 400 | 50 | 4.5 |
| C | 400 | 40 | 4.4 |
| | "Circosol" 4240 | | |
| D | 400 | 60 | 4.6 |
| E | 400 | 50 | 4.5 |
| F | 400 | 40 | 4.4 |

The resulting products were diluted with H₂O, treated with 28% NH₃ (28% NH₃ in H₂O), and maintained overnight at about 88° C. Then the viscosity and surface tension of the resulting emulsions were measured. The results obtained are shown below:

| Run | 28% NH₃ in H₂O | H₂O | pH | Visc. (50% TSC) | S. Tens. (25% TSC) |
|---|---|---|---|---|---|
| A | 50 | 414 | 9 | 1360 | 64.8 |
| B | 42 | 412 | 9.05 | 620 | 62.2 |
| C | 33 | 411 | 9.0 | 200 | 61.2 |
| D | 50 | 414 | 9.0 | 200 | 57.6 |
| E | 42 | 412 | 9.0 | 100 | 56.4 |
| F | 33 | 411 | 9.0 | 60 | 51.4 |

EXAMPLE 14

Acrylic acid was grafted onto petroleum oils at 88° C. for 2 hours following the procedure of Example 13, above. The ingredients and amounts were as follows:

| | Ingredient and Amounts | | |
|---|---|---|---|
| Run | Oil | Acrylic Acid | "VAZO" |
| | "Sunthene" 255 | | |
| A | 300 | 30 | 3.3 |
| B | 300 | 24 | 3.2 |
| C | 300 | 18 | 3.2 |
| | "Circosol" 4240 | | |
| D | 300 | 30 | 3.3 |
| E | 300 | 24 | 3.2 |
| F | 300 | 18 | 3.2 |

After polymerization, the products obtained were diluted with water and the pH adjusted to 9 with ammonia water (28% NH₃ in H₂O) to form emulsions. The pertinent data are shown below:

| | | Results | | |
|---|---|---|---|---|
| Run | 28% NH₃ in H₂O | H₂O | Viscosity (50% TSC) | S. Tens. (50% TSC) |
| A | 25 | 305 | 660 | 61.6 |
| B | 20 | 304 | 450 | 65.0 |
| C | 15 | 303 | 153 | 63.0 |
| D | 25 | 305 | 100 | 49.5 |
| E | 20 | 304 | 88 | 52.0 |
| F | 15 | 303 | 68 | 49.2 |

EXAMPLE 15

Following the methods of Examples 13 and 14 various monomers were graft polymerized onto petroleum oil at 88° C. for 2 hours according to the following polymerization receipe showing parts used:

| Run | Oil, "Sunthene" 4240 | Acrylic Acid | "VAZO" | Other Monomers |
|---|---|---|---|---|
| A | 100 | 15 | 1.0 | — |
| B | 100 | 12.5 | 1.0 | — |
| C | 100 | 10 | 1.0 | — |
| D | 100 | — | 1.0 | Styrene-5.0 |
| E | 100 | 7.5 | 1.0 | Styrene-7.5 |
| F | 100 | — | 1.0 | Styrene-7.5 + 0.5 Sulfole 120 |
| G | 100 | 5 | 1.0 | Styrene-5.0 |
| H | 100 | 7.5 | 1.0 | Styrene-2.5 |
| I | 100 | — | 1.0 | (1)HEA-15 |
| J | 100 | — | 1.0 | HEA-12.5 |
| K | 100 | — | 1.0 | HEA-10 |

(1)Hydroxyethyl acrylate After polymerization, the products obtained were diluted with water and treated with NH₃(28% NH₃ in H₂O), and the results obtained are shown below:

| Run | Viscosity (50% TSC) | pH | Surface Tension (20% TSC) |
|---|---|---|---|
| A | 700 | 6.7 | 56.2 |
| B | 300 | 7.1 | 54.3 |
| C | 200 | 7.1 | 53.5 |
| D | 700 | 7.2 | 46.5 |
| E | 420 | 7.4 | 43.7 |
| F | 300 | 7.8 | 40.0 |
| G | 220 | 7.3 | 42.7 |
| H | 400 | 7.7 | 48.4 |
| I | 3000 | 3.5 | 47.5 |
| J | 700 | 3.7 | 46.5 |
| K | 1200 | 3.7 | 46.5 |

EXAMPLE 16

Acrylic acid and styrene were graft polymerized onto petroleum oil using the procedures of Examples 13 and 14, above, at 88° C. for 2 hours:

| | Ingredients and Parts | | | |
|---|---|---|---|---|
| Run | "Circosol" 4240 | Acrylic Acid | "VAZO" | Styrene |
| A | 100 | 10 | 1.0 | — |
| B | 100 | 10 | 1.0 | 7.5 |
| C | 100 | 10 | 1.0 | 10 |
| D | 100 | 7.5 | 1.0 | 10 |
| E | 100 | 7.5 | 1.0 | 7.5 |

The products obtained were diluted with water, treated with ammonia (28% $NH_3$ in $H_2O$) and tested. The results obtained are shown below:

| Run | $H_2O$ | 28% $NH_3$ in $H_2O$ | pH | Viscosity (50% TSC) | S. Tens. (20% TSC) |
|---|---|---|---|---|---|
| A | 101.5 | 8.5 | 6.25 | 320 | 53 |
| B | 109.0 | 8.5 | 6.5 | 9000 | 43 |
| C | 111.5 | 8.5 | 6.75 | 6000 | 41 |
| D | 111.1 | 6.4 | 6.75 | 3500 | 40 |
| E | 108.0 | 6.4 | 6.75 | 1500 | 44 |

EXAMPLE 17

The aqueous alkaline emulsified grafted oils of Example 13, above were used in a process of aqueous emulsion polymerization of styrene. The polymerization charge was set at 40% TSC with 0.5 pt. ammonium persulfate, 0.1 "Sequestrene" $Na_3$, and varying amounts of styrene and the grafted oil (both, dry weights) were added. The pH was adjusted to about 9 with 28% $NH_3$ in $H_2O$, and the polymerization reaction was conducted at 52° C. The results produced are shown below:

| Run | Styrene, Parts | Ex. 13 Runs, Parts | Final Charge % TSC | pH | Poly sty.-graft oil initial Viscosity 40% TSC | Poly sty.-graft oil final Surface Tension 20% TSC** | Poly sty.-graft oil final Viscosity 40% TSC** |
|---|---|---|---|---|---|---|---|
| A | 60 | A-40 | # | — | — | — | — |
| B | 80 | A-20 | # | — | — | — | — |
| C | 60 | B-40 | # | — | — | — | — |
| D | 80 | B-20 | * | 9.3 | 9,200 | — | — |
| E | 60 | C-40 | * | 9.1 | 16,400 | — | — |
| F | 80 | C-20 | * | 8.9 | 8,000 | — | — |
| G | 60 | D-40 | 40.5 | 8.96 | 1,250 | 73 | 330 |
| H | 80 | D-20 | 40.7 | 8.7 | 1,650 | 74 | 335 |
| I | 60 | E-40 | 40.2 | 8.8 | 650 | 74 | 180 |
| J | 80 | E-20 | 40.3 | 8.6 | 800 | 72 | 190 |
| K | 60 | F-40 | 39.7 | 8.7 | 400 | 71 | 135 |
| L | 80 | F-20 | 40.3 | 8.6 | 400 | 74 | 115 |

\# - Coagulated.
\* - Not determined.
\*\*After addition of 1.0 part of "Tamol" N to the emulsion polystyrene-graft oil product of Runs G-L, above.

EXAMPLE 18

200 grams of acrylic acid were mixed with 22 grams of "VAZO" and heated to 40° C. to dissolve "VAZO". The resulting material was mixed with 2000 grams of "Circosol" 4240 oil and reacted in a one gallon reactor at 88° C. at 500 RPM for two hours. The resulting material had a viscosity (26° C.) of 1320 and a strong odor of acrylic acid. 200 grams of the resulting mixture were mixed with 2 grams "VAZO" in a 12 oz. citrate bottle for two hours at 190° F. to give a material with a viscosity (29° C.) of 2000 and with a noticeable but reduced acrylic acid odor.

EXAMPLE 19

1500 grams of "Circosol" 4240, 150 grams of acrylic acid and 16.5 grams of "VAZO" were mixed and added to 88° C. (preheated) reactor at 500 RPM. At one hour added thereto a mixture of 500 grams of "Circosol" 4240, 50 grams of acrylic acid and 5.5 grams of "VAZO" and the reaction continued for an additional hour at 88° C. There was a very strong acid odor after the additional hour. There also was a 150 gram buildup on the agitator.

EXAMPLE 20

1900 grams of "Circosol" 4240, 200 grams of acrylic acid and 16.5 grams of "VAZO" were mixed and placed in 75° C. reactor (preheated) at 500 RPM. The temperature was increased to 88° C. and reacted for one hour. After one hour there were added 100 grams of "Circosol" 4240 and 5.5 grams of "VAZO". Then the resulting mixture was reacted for one additional hour at 88° C. The final material had a viscosity of 900. There were approximately 80 gm. buildup on the agitator.

EXAMPLE 21

Acrylic acid grafted-petroleum oil alkaline emulsions (50% TSC) of Example 13, above, were mixed with carboxylated latices (53.2% TSC, pH9, aqueous emulsion terpolymer of about 75% by weight of styrene, 24% butadiene-1,3 and 1% itaconic acid). The viscosities of the resulting mixtures were tested. They were then mixed with $H_2O$, fillers and optionally a thickener and further tested as to viscosity. Adhesion tests, also, were conducted. The data on the same are presented below:

| Component | Parts By Weight | | | | | |
|---|---|---|---|---|---|---|
| Carboxylated latex | 131 | 131 | 131 | 131 | 131 | 131 |
| Ex. 13A | 60 | | | | | |
| Ex. 13B | | 60 | | | | |
| Ex. 13C | | | 60 | | | |

-continued

| Component | Parts By Weight | | | | | |
|---|---|---|---|---|---|---|
| Ex. 13D | | | | 60 | | |
| Ex. 13E | | | | | 60 | |
| Ex. 13F | | | | | | 60 |
| "Tamol" N (25% TSC) | 2 | 2 | 2 | 2 | 2 | 2 |
| Unfilled viscosity | 2,200 | 900 | 400 | 200 | 120 | 80 |
| H₂O | 24 | 24 | 24 | 24 | 24 | 24 |
| No. 9 NCS Whiting (filler) | 425 | 425 | 425 | 425 | 425 | 425 |
| "Alcogum" 9635 | — | — | — | 1.3 | 2.4 | 3.3 |
| Filled Viscosity | 31,500 | 20,500 | 14,500 | 7,000 | 4,600 | 3,100 |
| Thickened Viscosity | — | — | — | 11,400 | 14,100 | 13,200 |
| Cotton Ultimate Adhesion, 5 min. (lbs/2 in. strip) | 6.6 | 8.6 | 10.4 | 5.6 | 6.6 | 9.1 |
| Same, 15 min. | 7.0 | 7.4 | 7.8 | 6.1 | 7.3 | 9.9 |
| Carpet Ultimate Adhesion, jute to nylon, low level loop, dry (lbs/3 in. strip) | 6.6 | 7.7 | 7.6 | 9.1 | 8.5 | 10.5 |

In the above cotton adhesion test 2 pieces of cotton fabric 2" wide x about 6–7" long are used. A thin coating of the latex mixture is applied to one piece, the pieces are pressed together and then cured for 5 minutes at 177° C. or for 15 minutes at 177° C. The strength of the resulting adhesive bond in pounds (from the latex) is then measured by pulling the cotton pieces apart using an Instron tester at room temperatures (about 25° C.).

In the above carpet test, the latex mixture at a coating rate of 32 oz./sq. yd. is applied to the back of the nylon loop carpet containing a primary jute backing through which the nylon yarn is woven and the jute secondary layer, both about 3" wide x about 6–7" long, is pressed against the same. The assembly is then cured for 30 mins. at 177° C., and then the adhesive bond in pounds is determined by pulling on the Instron machine at room temperature.

EXAMPLE 22

Carboxylated latices were mixed with acrylic acid grafted petroleum oil aqueous alkaline emulsions (50% TSC), whiting, water and "Alcogum" and tested according to the method of Example 21 except as may be noted below. The data on the same are presented in the following tabulation.

| Material | Parts By Weight | | | | | |
|---|---|---|---|---|---|---|
| Carboxylated latex A | 180 | | | | | |
| Carboxylated latex B | | 182 | 164 | 146 | 164 | 146 |
| Oil emulsion A | | | 20 | 40 | | |
| Oil emulsion B | | | | | 20 | 40 |
| No. 9 NCS Whiting | 425 | 425 | 425 | 425 | 425 | 425 |
| Water | 33 | 31 | 29 | 27 | 29 | 29 |
| "Alcogum" 9635 | 2.5 | 3.2 | — | — | .3 | — |
| Viscosity, × 100 | 115 | 124 | 180 | 280 | 121 | 117 |
| Cotton ultimate adh., 15 min. (See Example 21, above) | — | — | — | 12.1 | — | 12.7 |
| Same, 5 min. | 8.5 | 12.2 | 12.6 | 6.3 | 12.4 | 9.8 |
| Carpet, ultimate adh., dry (See Example 21, above) | 10.8 | 13.9 | 12.6 | 11.5 | 12.9 | 13.9 |
| Same as above, wet | 5.9 | 5.1 | 5.3 | 4.4 | 4.8 | 4.9 |
| Tuft lock (lbs/tuft) | 8.7 | 12.1 | 15.3 | 10.8 | 13.1 | 11.9 |

The cotton adhesion tests and the dry carpet adhesion tests were the same as Example 21, above. For the carpet wet test the sample is prepared and cured as in the dry carpet test, is then immersed in water for 1 hour at R.T., squeezed to remove excess water, and finally tested for pounds adhesion on the Instron tester. In the tuft lock test the sample is prepared and cured as in the carpet test, and then a hook attached to the Instron tester is placed through a loop on the carpet sample and pulled to determine the pounds necessary to pull out the loop.

Carboxylated latex A was an aqueous emulsion, pH of 9 and TSC of about 55.5%, of a terpolymer of about 56% by weight of styrene, 43% butadiene-1,3 and 1% itaconic acid. Carboxylated latex B was an aqueous emulsion, pH9 and about 55% TSC, of a terpolymer of about 70% by weight of styrene, 29% butadiene-1,3, and 1% itaconic acid. Oil emulsion A, 50% TSC, was Example 13, Run B. Oil emulsion B, 50% TSC, was Example 13, Run C.

EXAMPLE 23

The method of this example was the same as those of Examples 21 and 22. The carboxylated latex C is an aqueous emulsion, pH9 and about 53.2% TSC, of a terpolymer of about 75% by weight of styrene, 24% butadiene-1,3 and 1% itaconic acid. The components of the composition and the test data are shown below:

| Material | Parts By Weight | | | | |
|---|---|---|---|---|---|
| | 1 | 2 | 3 | 4 | 5 |
| Carboxylated latex C | 188 | 169 | 150 | 169 | 150 |
| Oil emulsion A (Same as Ex. 22, above) | | 20 | 40 | | |
| Oil emulsion B (Same as Ex. 22, above) | | | | 20 | 40 |
| No. 9 NCS Whiting | 425 | 425 | 425 | 425 | 425 |
| Water | 25 | 24 | 23 | 24 | 23 |
| "Alcogum" 9635 | 2.9 | — | — | 0.4 | 0.4 |
| Viscosity, × 100 | 119 | 164 | 205 | 118 | 122 |
| Cotton, ultimate adh. (lbs./2" strip), dry | 12.1 | 11.8 | 12.1 | 11.9 | 12.0 |
| Carpet, ultimate adh. dry (lbs./3" strip) | 13.9 | 13.6 | 12.4 | 13.2 | 13.2 |
| Same as above, wet | 4.6 | 4.5 | 4.4 | 4.9 | 5.0 |
| Tuft, lock (lbs./tuft) | 15.9 | 12.1 | 11.4 | 12.9 | 14.0 |

EXAMPLE 24

The method of this example was the same as the methods of Examples 21 to 22 except as will be noted below:

| Material | Parts By Weight | | | | | | |
|---|---|---|---|---|---|---|---|
| Carboxylated latex A (Ex. 22) | 180 | | | | | | |
| Carboxylated latex C (Ex. 23) | | 132 | 132 | 132 | 132 | 132 | 132 |
| Ex. 14, Run A, above* | | 60 | | | | | |
| Ex. 14, Run B, above* | | | 60 | | | | |
| Ex. 14, Run C, above* | | | | 60 | | | |
| Ex. 14, Run D, above* | | | | | 60 | | |
| Ex. 14, Run E, above* | | | | | | 60 | |
| Ex. 14, Run F, above* | | | | | | | 60 |
| Water | 21 | 21 | 21 | 21 | 21 | 21 | 21 |
| No. 9 NCS Whiting | 425 | 425 | 425 | 425 | 425 | 425 | 425 |
| "Alcogum" 9635 | 2.5 | — | — | 1.6 | 2.6 | 2.8 | 3.1 |
| "Tamol" N (25% in H$_2$O) | — | 2 | 2 | 2 | 2 | 2 | 2 |
| Viscosity, × 100 | 123 | 275 | 200 | 120 | 117 | 122 | 121 |
| Viscosity stability | | | | | | | |
| 24 hrs., before stir., × 100 | 136 | 340 | 245 | 138 | 134 | 138 | 130 |
| 24 hrs., after stir., × 100 | 114 | 310 | 230 | 125 | 124 | 127 | 124 |
| Cotton, Ult. Adh., dry, 15 mins. (lbs./2" strip) | 7.9 | — | — | 11.8 | 7.7 | 10.4 | 9.4 |
| Same, 5 mins. | 7.5 | — | — | 10.5 | 7.3 | 7.5 | 8.9 |
| Carpet, Ult. Adh., dry (lbs./3" strip) | 12.4 | 5.0 | 4.0 | 9.4 | 10.4 | 10.0 | 9.9# |
| Same as above, wet | 7.5 | 3.1 | 2.8 | 3.5 | 3.7 | 3.7 | 4.2 |

*Aqueous alkaline oil emulsion, about 50% TSC # Tuft lock was 9.1 for this particular run.

With respect to viscosity stability, portions of the mixtures are allowed to stand for 24 hours and then the viscosity is determined. After such standing other portions of the mixtures are stirred for from 4 to 5 minutes, and then their viscosities are determined.

In the foregoing working examples the viscosities were Brookfield viscosities LVT in centipoises (cps) No. 3 spindle, 50–60 r.p.m. for compositions without filler, e.g. whiting. The filled or thickened viscosities were Brookfield viscosities RVT in centipoises, No. 5 spindle, 20 r.p.m. for compositions with the filler. All viscosities were at room temperature (R.T.), about 25° C., except where noted.

Notes:

"VAZO"—"VAZO" 64, azobisisobutyronitrile. A vinyl polymerization catalyst. Melts at 105° C. E.I. du Pont de Nemours and Co. (Inc.).

"Sunpar" 2280—Rbber process and extender oil. Paraffinic. Viscosity SUS/37.78° C. of 2642., m.w. of 720, 0% asphaltenes, 1.5% polar compounds, 22% aromatics, 76.5% saturates; carbon type analysis, %, $C_A$-4, $C_N$-25, and $C_P$-71; ASTM D-2226 Type 104 B. Sun Oil Co.

"Circosol" 4240—Rubber process and extender oil. Naphthenic. Viscosity SUS/37.78° C. of 2525, m.w. of 395, 0% asphaltenes, 2.7% polar compounds, 44.8% aromatics, 52.5% saturates; carbon type analysis, %, $C_A$-21, $C_N$-39, and $C_P$-40; ASTM D-2226 Type 103. Sun Oil Co.

"Sundex" 790—Rubber process and extender oil. Aromatic. Viscosity SUS/37.78° C. of 3500, m.w. of 375, 0.1% asphaltenes, 10.4% polar compounds, 73.2% aromatics, 16,3% saturates; carbon type analysis, %, $C_A$-37, $C_N$-28, and $C_P$-35. ASTM D-2226 Type 102. Sun Oil Co.

"Sulfole" 120—t-dodecyl mercaptan. Av. mol. wt. 198. Calc. purity, wgt. %, 96.8. Phillips Petroleum Company.

"Sequestrene" Na$_3$—Trisodium salt of ethylenediamine tetra acetic acid. Ciba-Geigy.

"Tamol" N—Dispersant. Sodium salt of condensed naphthalene sulfonic acid. Rohm & Haas Co.

"Sunthene" 255—Rubber process and extender oil. Naphthenic. Viscosity SUS/37.78° C.-420, m.w. of 440. 0% asphaltenes, 0.6% polar compounds, 27.4% aromatics, 72% saturates; carbon type analysis, %, $C_A$-9, $C_N$-33, $C_P$-58. Sun Oil Co.

"Sunthene" 4240—Rubber process and extender oil. Naphthenic. Viscosity SUS/37.78° C. of 2206. m.w. of 400. 0% asphaltenes, 1.1% polar compounds, 43.9% aromatics, 55% saturates; carbon type analysis, %, $C_A$-18, $C_N$-41 and $C_P$-41. ASTM D-2226 Type 103. Sun Oil Co.

No. 9 Whiting—No color standard, medium ground whiting. 95% calcium carbonate (min.) of which 93%±2% is finer than 325 mesh USS screen. Georgia Marble Co.

"Alcogum" 9635—A sodium polyacrylate thickener. Alco Chemical Co.

EXAMPLE 25

8 parts by weight of an aqueous solution of polyacrylic acid (TSC 50±1% in H$_2$O, molecular weight of about 5,000, high purity H$_2$O soluble polyacrylic acid, pH 1.5 to 2, "Good-rite" 732, The B.F. Goodrich Company) were mixed with varying amounted of "Circosol" 4240 oil and water containing NH$_4$OH to give alkaline aqueous mixture (pH9). The total solids content of the aqueous mixtures was about 17.5–18.5%. In the mixtures the dry ratio of the oil to the polyacrylic acid was about 100/4.2, 100/8.4, 100/12.6 and 100/16.8. The resulting mixtures did not form stable emulsions, e.g., they separated into two layers.

EXAMPLE 26

The procedure of Example 25, above, was followed except that the polyacrylic acid used had a higher molecular weight (m.w. of about 90,000 in H$_2$O, TSC 25±1%, pH2to 3, "Good-rite" 702, The B.F. Goodrich Co.). The resulting aqueous mixtures had a total solids content of about 18–18.5%. In the mixtures the ratio on a dry basis of the oil to the polyacrylic acid was about 100/3, 100/61, 100/9 and 100/12. The final alkaline oil-acid aqueous emulsions were semistable.

These oil-acid aqueous mixtures were mixed with butadiene-1,3 and styrene and enough water to make a total solids content of about 42–43%. In the resulting polymerization mixture on a dry weight basis the ratio of oil to styrene to butadiene was 30/50/20, the acid being an addition in the ratio as shown above. To these were added catalyst but no Sulfole, and copolymerizations were attempted according to the general method of Example 7, above, except that the grafted oil of Example 6 was omitted. The resulting latices either coagulated or formed a sludge.

The results of Examples 25 and 26 would indicate that mixtures of polyacrylic acids and petroleum oils do not form satisfactory emulsions.

The embodiments of the invention in which an exclusive property or privilege is claimed are defined as follows:

1. A method which comprises coating the backing of a carpet comprising a plurality of fibers or tufts woven with a first fibrous backing with an aqueous curable adhesive composition and then applying with pressure a second fibrous backing material to said adhesive coated first fibrous backing to form a laminate, said adhesive being present in an amount sufficient to secure the ends of said fibers or tufts to said first backing material and to secure said second backing material to said first backing material, and then heating the resulting laminate at a temperature and for a time sufficient to dry said adhesive and said secondary backing and to cure said adhesive to bind the ends of the fibers or tufts of said carpet to said primary backing and said primary backing to said secondary backing together into a unitary laminate without adversely affecting the fibers or tufts of said carpet, said adhesive in said composition comprising a blend of a polymer and a minor amount by weight of extender for said polymer, said extender comprising a mineral oil containing, per 100 parts by weight of said oil, graft polymerized to said oil from about 2 to 20 parts by weight of an ethylenically unsaturated monomer having from 2 to 16 carbon atoms and said polymer being a copolymer of a diene selected from the group consisting of butadiene, isoprene and 2,3-dimethyl butadiene and at least one copolymerized monomer selected from the group consisting of acrylic acid, methacrylic acid, maleic acid, maleic anhydride, fumaric acid, itaconic acid, vinyl benzoic acid, α-chloro acrylic acid and crotonic acid.

2. A method according to claim 1 where said copolymer contains additionally at least one copolymerized monomer selected from the group consisting of styrene, α-methyl styrene, vinyl toluene, acrylonitrile, methacrylonitrile, methylacrylate, ethylacrylate, butylacrylate, ethylhexylacrylate, methyl methacrylate, hydroxy ethylacrylate, hydroxy propylacrylate, hydroxy ethyl methacrylate, acrylamide and methacrylamide.

3. A method according to claim 2 in which said extender is used in an amount of from about 5 to 40 parts by weight per 100 parts by weight of said polymer.

4. A method according to claim 3 in which (I) said adhesive is an aqueous alkaline emulsion of a flexible crosslinkable COOH - containing polymer and (II) said oil has (1) a pour point below about 30° C., (2) a SUS viscosity at about 38° C. of from about 40 to 27,000, (3) a molecular weight of from 220 to 2,400, (4) a clay-gel molecular weight analysis of % by weight of from about 0 to 0.1 asphaltenes, from about 0.2 to 18 polar compounds, from about 10 to 80 aromatic compounds and from about 10 to 90 saturated compounds, and (5) a carbon type analysis of from about 3 to 47% aromatic carbon atoms, from about 19 to 44% naphthenic carbon atoms and from about 31 to 73% paraffinic carbon atoms.

5. A method according to claim 4 in which the amount of said monomer is from about 5 to 15 parts by weight and in which said oil has a SUS viscosity at about 38° C. of from about 40 to 7,000 and a molecular weight of from about 220 to 720.

6. A method according to claim 5 in which the alkaline material in said emulsion comprises $NH_4OH$ and in which said monomer is at least one acid selected from the group consisting of acrylic, methacrylic, maleic, fumaric, itaconic, vinyl benzoic acid, α-chloroacrylic acid and crotonic acids.

7. A method according to claim 6 in which said polymer is a COOH - containing butadiene-1,3/styrene copolymer and in which said monomer is acrylic acid.

8. A method according to claim 7 in which said laminate is heated at a temperature of from about 120° to 205° C. for from about 1 to 30 minutes.

9. The product produced by the method of claim 1.

10. The product produced by the method of claim 7.

* * * * *

UNITED STATES PATENT AND TRADEMARK OFFICE
CERTIFICATE OF CORRECTION

PATENT NO. : 4,191,799
DATED : March 4, 1980
INVENTOR(S) : Gruber

It is certified that error appears in the above-identified patent and that said Letters Patent are hereby corrected as shown below:

Col. 19, line 37
"copolymerized" should read ---copolymerizable ---.

Signed and Sealed this

Third Day of June 1980

[SEAL]

Attest:

SIDNEY A. DIAMOND

Attesting Officer    Commissioner of Patents and Trademarks